United States Patent
Yang et al.

(10) Patent No.: US 9,752,665 B2
(45) Date of Patent: Sep. 5, 2017

(54) COMPLIANCE MOTOR STRUCTURE AND MANUFACTURING METHOD THEREOF

(71) Applicant: Industrial Technology Research Institute, Hsin-Chu (TW)

(72) Inventors: Han-Ping Yang, Hsinchu (TW); Yi-Jeng Tsai, Taoyuan County (TW); Chau-Shin Jang, Hsinchu County (TW); Jih-Yang Chang, Taoyuan County (TW); Hsin-Tien Yeh, Taichung (TW); Cheng-Hsuan Lin, Taoyuan County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 276 days.

(21) Appl. No.: 14/583,424

(22) Filed: Dec. 26, 2014

(65) Prior Publication Data
US 2016/0153535 A1    Jun. 2, 2016

(30) Foreign Application Priority Data
Dec. 2, 2014    (TW) .............................. 103141808 A

(51) Int. Cl.
*F16H 37/08*    (2006.01)
*H02K 7/116*    (2006.01)
(Continued)

(52) U.S. Cl.
CPC ......... *F16H 37/0826* (2013.01); *H02K 7/116* (2013.01); *H02K 16/00* (2013.01);
(Continued)

(58) Field of Classification Search
None
See application file for complete search history.

(56) References Cited

U.S. PATENT DOCUMENTS 4,488,053 A * 12/1984 Cronin .................... F16H 3/724
                                                            290/4 C
4,761,588 A    8/1988 Youcef-Toumi et al.
(Continued)

FOREIGN PATENT DOCUMENTS

CN            2478837       2/2002
CN        201975958 U       9/2011
(Continued)

OTHER PUBLICATIONS

Taiwan Intellectual Property Office, Office Action issued Oct. 21, 2015.
(Continued)

*Primary Examiner* — Justin Holmes
(74) *Attorney, Agent, or Firm* — WPAT, PC

(57) ABSTRACT

The present invention discloses a compliance motor structure and the manufacturing method thereof. The motor structure may include a first motor, a second motor and a first gear set. The first motor may include a first rotor. The second motor may include a second rotor. The first gear set may include a first inner input shaft, a second outer shaft and a first output shaft, which are coupled to each other; the first inner input shaft may be connected to the first rotor, and the first outer input shaft may be connected to the second rotor; the power generated by the first motor and the second motor, coupled to the first gear set, can be outputted via the first output shaft.

22 Claims, 11 Drawing Sheets

(51) Int. Cl.
*H02K 16/00* (2006.01)
*F16H 49/00* (2006.01)
*F16H 1/32* (2006.01)

(52) U.S. Cl.
CPC .............. *F16H 1/32* (2013.01); *F16H 49/001* (2013.01); *H02K 2213/09* (2013.01)

(56) References Cited

U.S. PATENT DOCUMENTS

| | | | |
|---|---|---|---|
| 5,134,346 | A | 7/1992 | Schneider et al. |
| 5,355,743 | A | 10/1994 | Tesar |
| 5,751,086 | A | 5/1998 | Taghezout |
| 7,345,390 | B2 | 3/2008 | Sch et al. |
| 7,397,156 | B2 | 7/2008 | Mukai et al. |
| 7,538,466 | B2 | 5/2009 | Chang et al. |
| 2006/0025262 | A1* | 2/2006 | Kleman ............ B60K 6/365 475/5 |
| 2008/0176704 | A1* | 7/2008 | Raghavan ........... F16H 3/728 475/275 |
| 2012/0286616 | A1 | 11/2012 | Li et al. |
| 2013/0118213 | A1 | 5/2013 | Jun et al. |
| 2013/0190961 | A1 | 7/2013 | Yuan |
| 2013/0249444 | A1* | 9/2013 | Golding ........... F16H 37/065 318/8 |
| 2014/0015382 | A1* | 1/2014 | Kim .................. H02K 7/14 310/67 R |
| 2014/0100076 | A1* | 4/2014 | Bowman ........... B60W 20/00 477/5 |
| 2015/0105200 | A1* | 4/2015 | Duhaime ........... F16H 3/725 475/5 |

FOREIGN PATENT DOCUMENTS

| | | |
|---|---|---|
| CN | 2478837 | 10/2012 |
| CN | 102729258 | 10/2012 |
| JP | 2013094017 | 5/2013 |
| TW | 434977 | 5/2001 |
| TW | 471214 | 1/2002 |
| TW | 543266 | 7/2003 |
| TW | 546890 | 8/2003 |
| TW | I253800 | 4/2006 |
| TW | 200701597 | 1/2007 |
| TW | I274460 | 2/2007 |
| TW | I292650 | 1/2008 |
| TW | M448397 | 3/2013 |
| TW | I396378 | 5/2013 |
| TW | I401144 | 7/2013 |
| TW | M462709 | 10/2013 |
| TW | 201417462 | 5/2014 |
| TW | 201421869 | 6/2014 |
| TW | 201431720 | 8/2014 |

OTHER PUBLICATIONS

Atsuo Kawamura et al., "Analysis on the Two Axis Motor (Super Motor) for Electric Vehicles", Mar. 2004.

Ronghai Qu et al., "Dual-Rotor, Radial-Flux, Toroidally Wound, Permanent-Magnet Machines", Nov. 2003, 1665-1673, 39-6.

Byeong-Sang Kim et al., "A Serial-Type Dual Actuator Unit With Planetary Gear Train: Basic Design and Applications", Feb. 2010, 108-116, 15-1.

Jwu-Sheng Hu et al., "A New Differential-Velocity-Type Joint Design for Robotic Manipulators", Nov. 2012.

D. Platt et al., "Twin rotor drive for an electric vehicle", Mar. 1993, 131-138, 140-2.

Francesco Profumo et al., "Axial Flux Machines Drives: a New Viable Solution for Electric Cars", Feb. 1997.

Atsuo Kawamura et al., "Analysis of Anti-Directional-Twin-Rotary Motor Drive Characteristics for Electric Vehicles", Feb. 1997.

Ronghai Qu et al., "Design and Paramter Effect Analysis of Dual-Rotor, Radial-Flux, Toroidally Wound, Permanent-Magnet Machines", Jun. 2004, 771-779, 40-3.

Hong-Sen Yan et al., "A novel configuration for a brushless DC motor with an integrated planetary gear train", Sep. 2005.

Hiroyasu Iwata et al., "A Physical Interference Adapting Hardware system using MIA Arm and Humanoid Surface Covers", Oct. 1999.

Taisuke Sugaiwa et al., "New Visco-Elastic Mechanism Design for Flexible Joint Manipulator", Jul. 2008.

Hiroaki Seki et al., "SCARA Type Robot Arm with Mechanically Adjustable Compliant Joints", Sep. 2006.

* cited by examiner

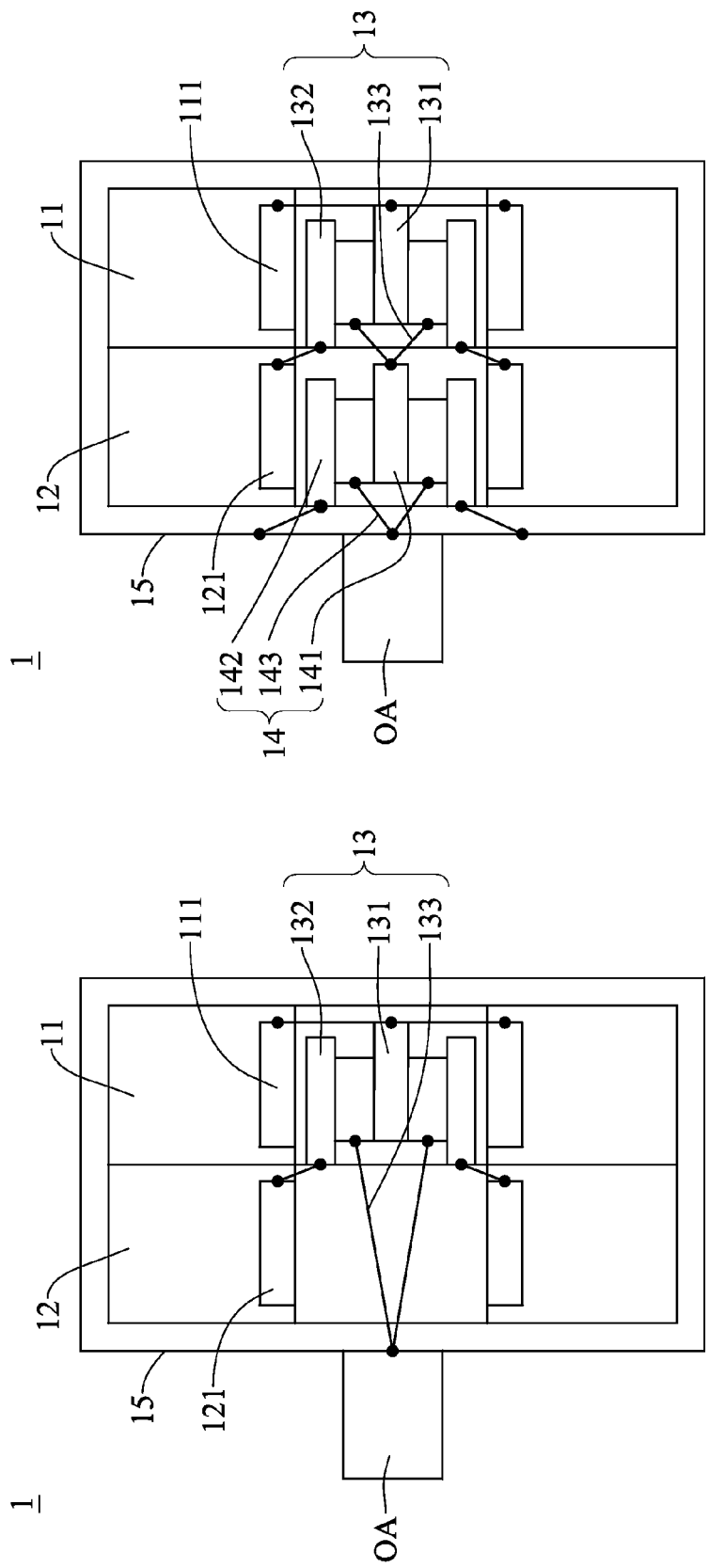

COMPLIANCE MOTOR STRUCTURE AND MANUFACTURING METHOD THEREOF

CROSS REFERENCE TO RELATED APPLICATION

This application also claims priority to Taiwan Patent Application No. 103141808 filed in the Taiwan Patent Office on Dec. 2, 2014, the entire content of which is incorporated herein by reference.

TECHNICAL FIELD

The present disclosure relates to a motor structure, more particularly to a compliance motor structure with compact structure design able to significantly reduce the size of the motor structure and achieve compliance simultaneously. The invention further relates to the method for manufacturing the appliance motor structure.

BACKGROUND

In recently years, as the global trend of aging society, the demand of medical assist devices is gradually increased. For the reason, a variety of medical assist robots are developed, such as exoskeleton robot, surgical robot, rehabilitation robot and the like. In general, joints in these robots are driven by rotatory actuator module, which is composed of motor and gearbox, and provides appropriate rotational speed and torque output. The protection mechanism is also very important for these actuator modules, especially for rehabilitation applications. For the module, too much power or higher stiffness will easily cause patient harm, but too little power or higher compliance will not be able to drive the required motion. How to achieve an active compliance control which can adjust the actuator module from stiff to compliant operation is a key issue in medical assist devices.

Power coupling technique is one of methods to realize active compliance control. Output power from two motors are coupled by at least one differential gear set, where one of the motors provides positioning function, so-called position motor, and the other provides stiffness adjustment function through manipulation of its torque output, called stiffness motor. During operating, position of the actuator module is controlled by position motor, and stiffness is by the stiffness motor. Both position control and torque control algorithm is able to be performed on each motor by a typical motor controller, and therefore the compliance of actuator module can be achieved by varying torque output on stiffness motor. However, in previous design, extra housings or mounting structures are required to couple two motors and the differential gearbox, which will significantly increase total size of the actuator module; as the consequence, the conventional two motors design is not suitable for portable applications, especially for the portable assist devices.

In general, this two motors design, called dual-motor structure, can be classified into two types, including series-connected dual-motor structure and parallel-connected dual-motor structure. For example, Taiwan Patent Publication No. I274460 disclosed a series-connected dual-motor structure, which connects two motors to a planetary gear set in series. The planet carrier and the ring gear of the planetary gear set are driven by two motors, respectively. The coupled power is outputted from the sun gear of the planetary gear set. This series-connected type is relatively narrow in outside diameter than parallel-connected type, but its length is significantly increased. This increased length causes difficulty of mechanical design, and increasing its overall size. U.S. Pat. No. 7,538,466 also has the same difficulties.

Taiwan Patent Publication No. I292650 disclosed a parallel-connected dual-motor structure, in which two motors are arranged side by side, and connected to a planetary gear set. This parallel-connected type is shorter than series-connected type, but its outer dimension is wider in these two types, which also causes similar difficulties in mechanical design.

Therefore, to provide an actuator module having compliance manipulation ability and compact size become an important issue.

SUMMARY

The present disclosure provides a compliance motor structure, which may include a first motor, a second motor, and a first gear set. The first motor may include a first rotor. The second motor may include a second rotor. The first gear set may include a first inner input shaft, a first outer input shaft and a first output shaft coupled to each other. The first inner input shaft may be connected to the first rotor; the first outer input shaft may be connected to the second rotor, whereby a power generated by the first motor and the second motor, coupled to the first gear set, being outputted via the first output shaft.

The present disclosure further provides a method for manufacturing a compliance motor, which may include the following steps: providing a first motor having a first rotor; providing a second motor having a second rotor; providing a first gear set having a first inner input shaft, a first outer input shaft and a first output shaft coupled to each other; and connecting the first inner input shaft to the first rotor, and connecting the first outer input shaft to the second rotor, whereby a power generated by the first motor and the second motor, coupled to the first gear set, is outputted via the first output shaft.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1 is the schematic view of the compliance motor structure in accordance with the present invention.

FIG. 2 is another schematic view of the compliance motor structure in accordance with the present invention.

DETAILED DESCRIPTION

Figure 3:
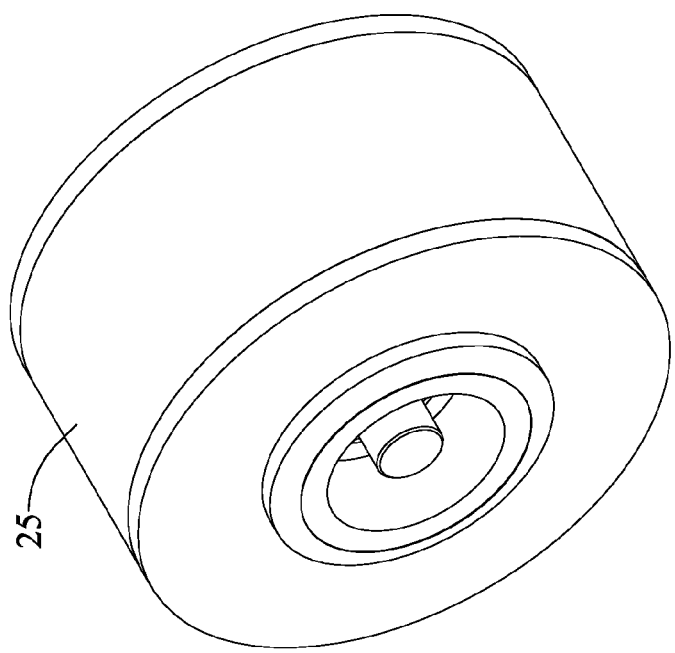
FIG. 3 is the first schematic view of the first embodiment of the compliance motor structure in accordance with the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is the schematic view of the compliance motor structure in accordance with the present invention. As shown in FIG. 1, the compliance motor structure 1 in accordance with the present invention may include a first motor 11, a second motor 12, a first gear set 13, a casing 15 and an output shaft OA.

The first motor 11 may include a first rotor 111, and the first rotor 111 may be hollow; the second motor 12 may include a second rotor 121, and the second rotor 121 may be hollow, where the first motor 11 and the second motor 12 may be servo motors. The first gear set 13 may be disposed in the accommodating space inside the first rotor 111; the first gear set 13 may include a first inner input shaft 131, a first outer input shaft 132 and a first output shaft 133, and the first inner input shaft 131, the first outer input shaft 132 and the first output shaft 133 are coupled to each other. The first inner input shaft 131 may be connected to the first rotor 111; the first outer input shaft 132 may be connected to the second rotor 121; and the first output shaft 133 may pass through the hollow center of the second rotor 121 to connect to the output shaft OA of the compliance motor structure 1. By means of the above structure, the power generated by the first motor 11 and the second motor 12 coupled to each other can be outputted via the first output shaft 133.

As described above, the two input shaft 131, 132 of the first gear set 13 can be respectively connected to the first rotor 111 and the second rotor 121. Therefore, the power generated by the first motor 11 and the second motor 12, coupled to the first gear set 13, can be outputted via the first output shaft 133; besides, the first gear set 13 can be disposed in the accommodating space inside the hollow center of the first rotor 111, which can dramatically reduce the overall size of the compliance motor structure 1 with two motors and one gear set and make it more compact.

Please refer to FIG. 2, which is another schematic view of the compliance motor structure in accordance with the present invention. As shown in FIG. 2, the compliance motor structure 1 in accordance with the present invention may include a first motor 11, a second motor 12, a first gear set 13, a second gear set 14, a casing 15 and an output shaft OA.

The first motor 11 may include a first rotor 111, and the first rotor 111 may be hollow; the second motor 12 may include a second rotor 121, and the second rotor 121 may be hollow. The first gear set 13 may be disposed in the accommodating space inside the first rotor 111; the first gear set 13 may include a first inner input shaft 131, a first outer input shaft 132 and a first output shaft 133, and the first inner input shaft 131, the first outer input shaft 132 and the first output shaft 133 are coupled to each other. The first inner input shaft 131 may be connected to the first rotor 111; the first outer input shaft 132 may be connected to the second rotor 121.

Similarly, the second gear set 14 may be disposed in the accommodating space inside the second rotor 121; the second gear set 14 may include a second inner input shaft 141, a second outer input shaft 142 and a second output shaft 143, and the second inner input shaft 141, the second outer input shaft 142 and the second output shaft 143 are coupled to each other. The first output shaft 133 may be connected to the second inner input shaft 141; the second output shaft 143 may be connected to the output shaft OA of the compliance motor structure 1; and the second outer input shaft 142 may be fixed on the casing 15. By means of the above structure, the power generated by the first motor 11 and the second motor 12, coupled to the first gear set 13 and the second gear set 14, can be transmitted through the first output shaft 133 and the second inner input shaft 141, and then outputted via the second output shaft 143.

As described above, the two input shaft 131, 132 of the first gear set 13 can be respectively connected to the first rotor 111 and the second rotor 121; the first output shaft 133 may be connected to the second inner input shaft 141 of the second gear set 14. Thus, the power generated by the first motor 11 and the second motor 12, coupled to the first gear set 13 and the second gear set 14, can be transmitted through the first output shaft 133 and the second inner input shaft 141, and then outputted via the second output shaft 143; besides, the first gear set 13 and the second gear set 14 can be respectively disposed in the accommodating spaces inside the hollow centers of the first rotor 111 and the second rotors 121, which can dramatically reduce the overall size of the compliance motor structure 1 with two motors and two gear set, and make it more compact.

Figure 4:
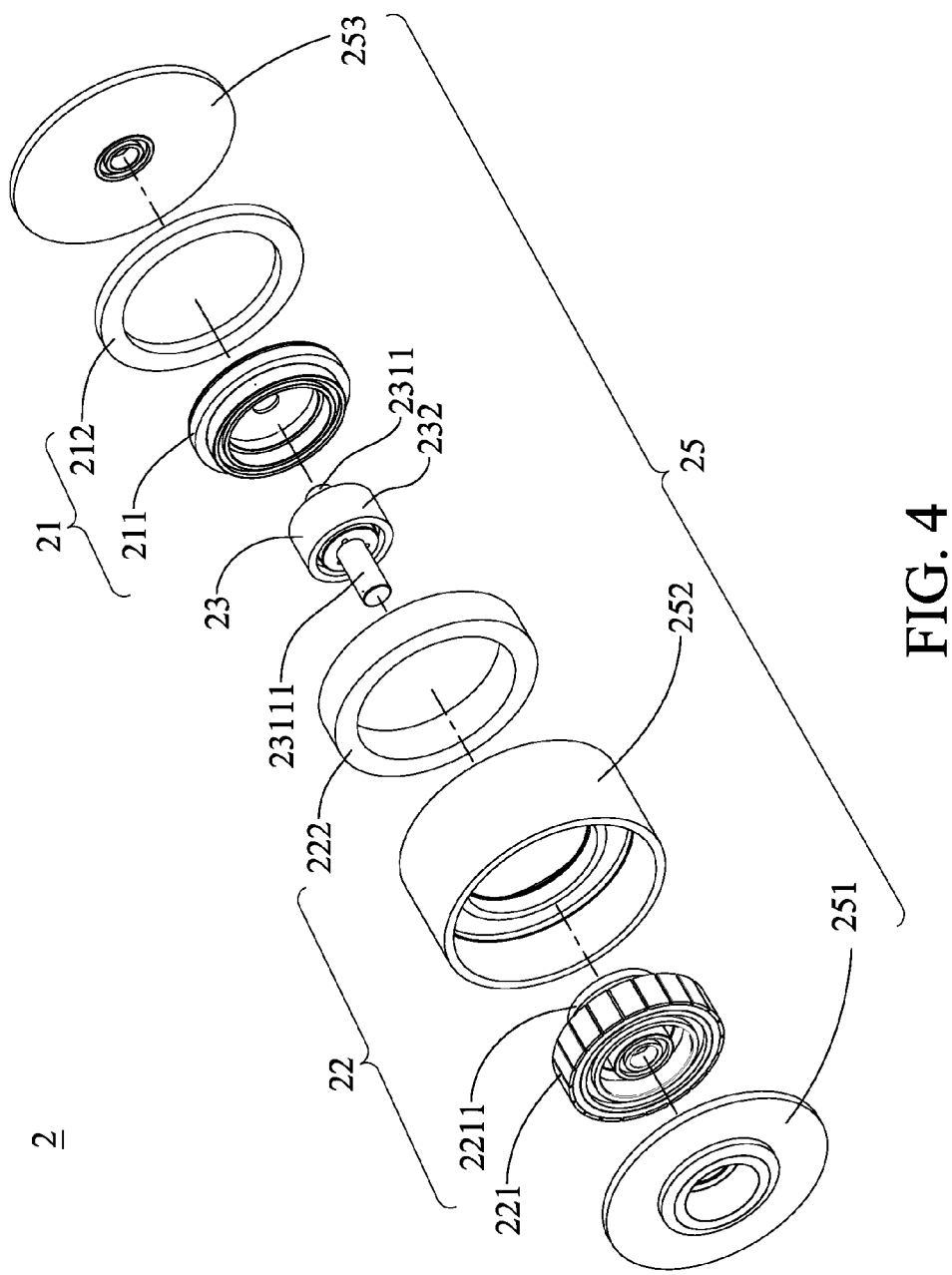
FIG. 4 is the second schematic view of the first embodiment of the compliance motor structure in accordance with the present invention.
Figure 5:
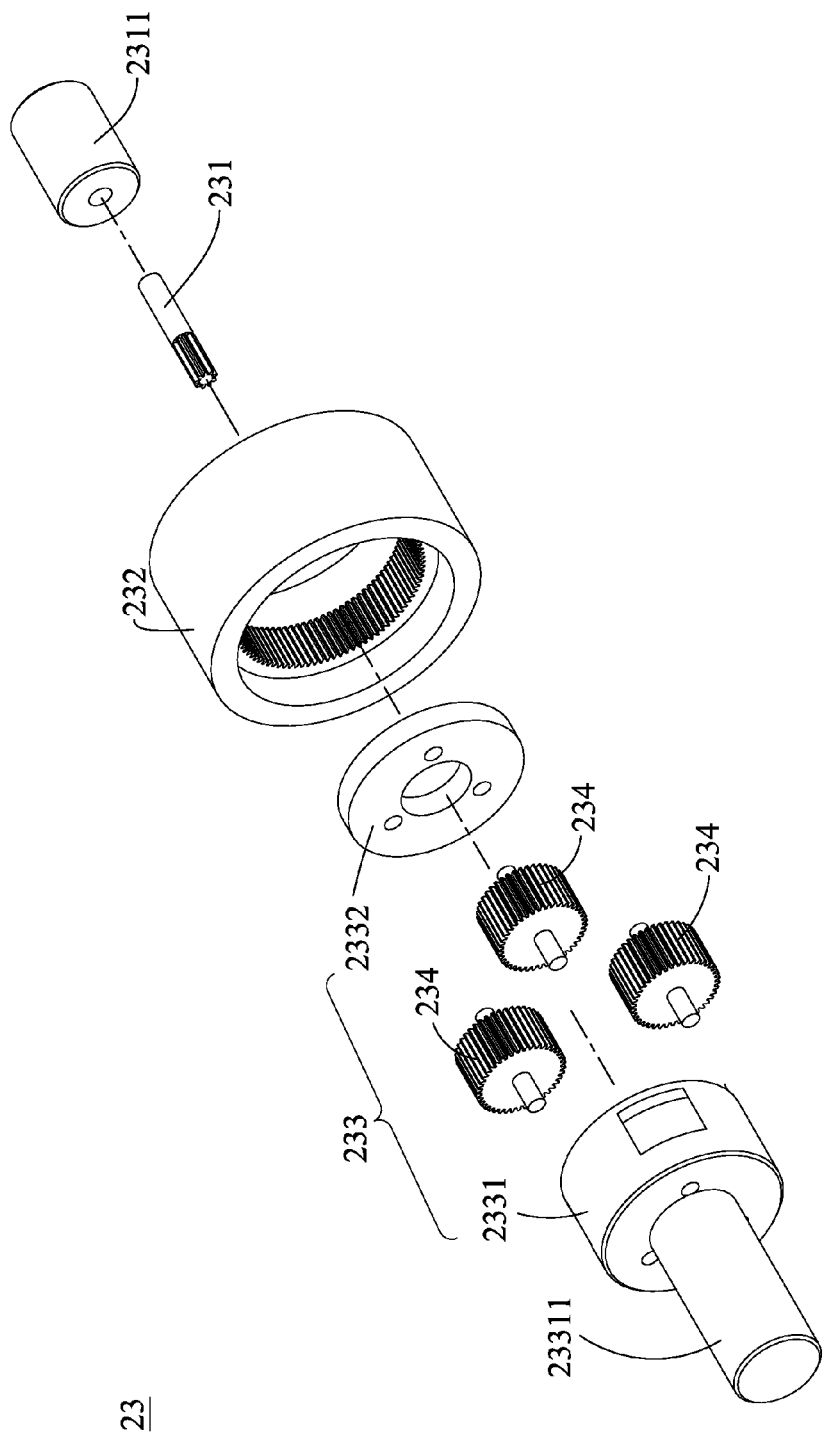
FIG. 5 is the third schematic view of the first embodiment of the compliance motor structure in accordance with the present invention.

Please refer to FIG. 3, FIG. 4 and FIG. 5, which are the first schematic view, second schematic view and third schematic view of the first embodiment of the compliance motor structure in accordance with the present invention. The embodiment illustrates a dual-motor structure with single gear set. As shown in FIG. 3 and FIG. 4, the compliance motor structure 2 may include a first servo motor 21, a second servo motor 22, a differential gear set 23 and a casing 25.

As shown in FIG. 4, the casing 25 may include a front cover 251, an annular main body 252 and a rear cover 253; the casing 25 can accommodate the first servo motor 21, the second servo motor 22 and the differential gear set 23.

The first servo motor 21 may include a first stator 212 and a first rotor 211, where the first stator 212 and the first rotor 211 may be hollow; the first rotor 211 can be disposed in the accommodating space inside the hollow center of the first stator 212. The second servo motor 22 may include a second stator 222 and a second rotor 221, where the second stator 222 and the second rotor 221 may be hollow; the second rotor 221 can be disposed in the accommodating space inside the hollow center of the second stator 222.

The differential gear set 23 may be a planetary gear set, which may be disposed in the accommodating space of the hollow center of the first rotor 211; as shown in FIG. 5, the differential gear set 23 may include a first sun gear 231, a first ring gear 232, a first planet carrier 233 and a plurality of first planet gears 234; the first sun gear 231, the first ring gear 232 and the first planet carrier 233 are coupled to each other via the first planet gears 234. As shown in FIG. 4 and FIG. 5, the first sun gear 231 may be connected to the first rotor 111 via a cup-shaped extension component 2311; further, the second rotor 221 may include a rotor extension part 2211, and the second rotor 221 may be connected to the first ring gear 232 via the rotor extension part 2211. The first planet carrier 233 may include a first planet carrier front cover 2331 and a first planet carrier rear cover 2332; and the first planet carrier front cover 2331 may include a cup-shaped first planet carrier extension part 23311, which can pass through the hollow center of the second rotor 221 to extend to the outside of the casing 25 and serve as the output shaft of the compliance motor structure 2.

By means of the above structure, the power generated by the first servo motor 21 and the second servo motor 22, coupled to the differential gear set 23, can be outputted via the first planet carrier 233. In other preferred embodiments, the differential gear set 23 can be a cycloidal gear set or a harmonic gear set or other gear structures whose output shaft and input shaft are on the same axis. Besides, the aforementioned compliance motor structure 2 may further include at least one encoder and at least one Hall sensor (not shown in the drawings); both of them can be disposed inside the casing 25. Of course, the above structure design is just for example instead of limitation; the present invention is not limited to the above structure.

It is worthy to note that the conventional dual-motor structure can be, generally speaking, classified into two types, including series-connected dual-motor structure and parallel-connected dual-motor structure; however, the overall size of the conventional series-connected dual-motor structure and parallel-connected dual-motor structure is too large in mobility application and more difficult to apply in the mechanism. On the contrary, according to the above description of the embodiment, the differential gear set 23 can be disposed in the accommodating space inside the hollow center of the first rotor 211; moreover, the Hall sensor and the encoder can also be disposed inside the casing 25. Accordingly, both of the length and outside diameter of the compliance motor structure 2 with two motors and one gear set can be reduced simultaneously, which can dramatically decrease its overall size and make it easier to apply.

Furthermore, the two input shafts of the differential gear set 23, the first sun gear 231 and the first ring gear 232 can be respectively connected to the first rotor 211 and the second rotor 221; therefore, the power generated by the first servo motor 21 and the second servo motor 22, coupled to the differential gear set 23, can be outputted via the first planet carrier 233. In this way, the compliance of the dual-motor structure can be adjusted via varying the torque output of stiffness motor.

Additionally, the first sun gear 231 of the differential gear set 23 can be connected to the first rotor 211, and the first ring gear 232 can be connected to the rotor extension part 2211 of the second rotor 221; in this way, the first servo motor 21 and the second servo motor 22 can be coupled to the differential gear set 23 without complicated interface structure, which not only significantly decreases the complexity of the dual-motor structure, but also reduces the cost of the dual-motor structure. Accordingly, the compliance motor structure can be applicable to exoskeleton robot, surgical robot, rehabilitation robot and other medical assistive devices. It can be seen that the compliance motor structure according to the present invention has excellent practicality and of high commercial value; therefore, the compliance motor structure according to the present invention definitely has an inventive step.

Figure 6:
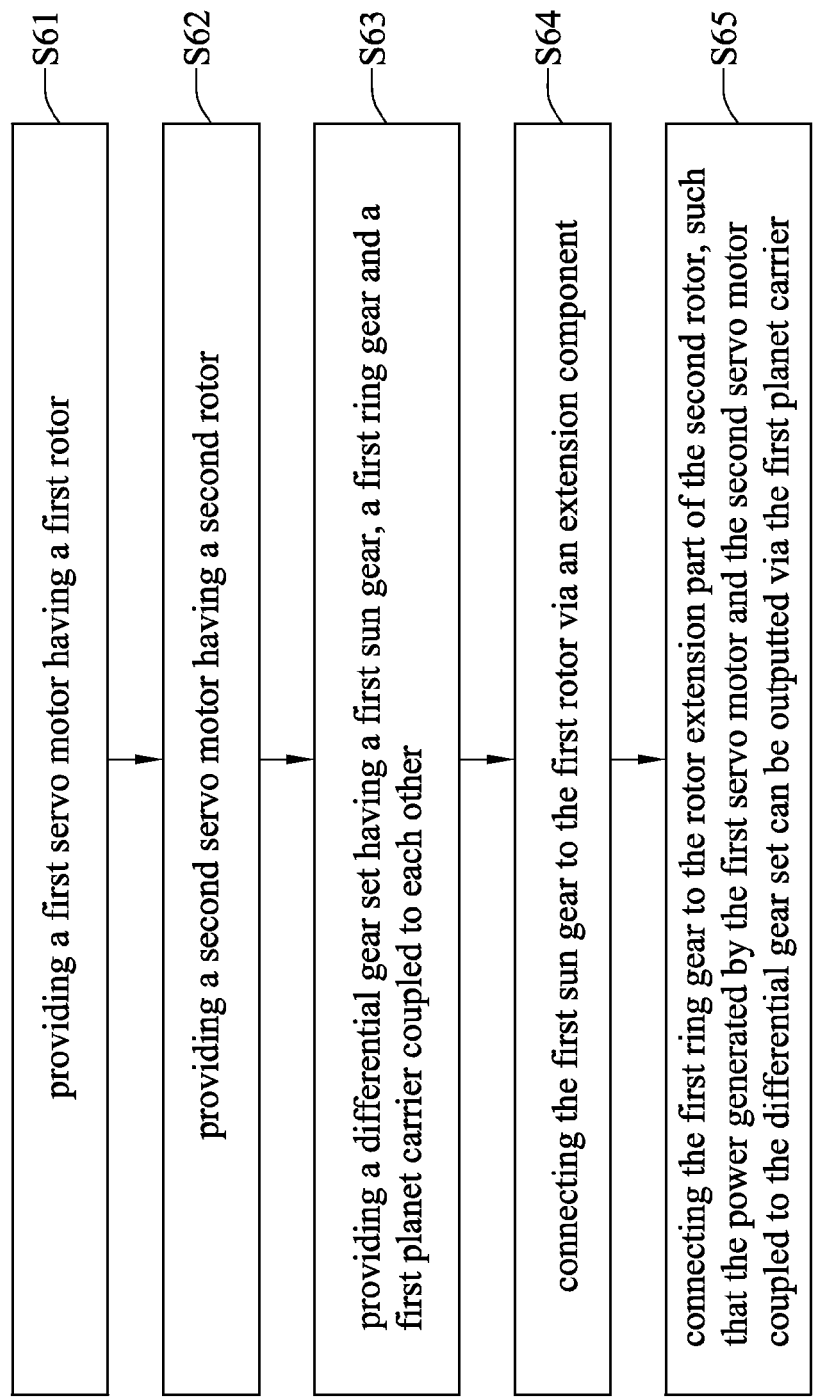
FIG. 6 is the flow chart of the first embodiment of the method for manufacturing the compliance motor structure in accordance with the present invention.

Please refer to FIG. 6, which is the flow chart of the first embodiment of the method for manufacturing the compliance motor structure in accordance with the present invention. The method for manufacturing the compliance motor structure of the embodiment may include the following steps:

In Step S61: providing a first servo motor having a first rotor.

In Step S62: providing a second servo motor having a second rotor.

In Step S63: providing a differential gear set having a first sun gear, a first ring gear and a first planet carrier coupled to each other.

In Step S64: connecting the first sun gear to the first rotor via an extension component.

In Step S65: connecting the first ring gear to the rotor extension part of the second rotor, such that the power generated by the first servo motor and the second servo motor, coupled to the differential gear set, can be outputted via the first planet carrier.

Figure 7:
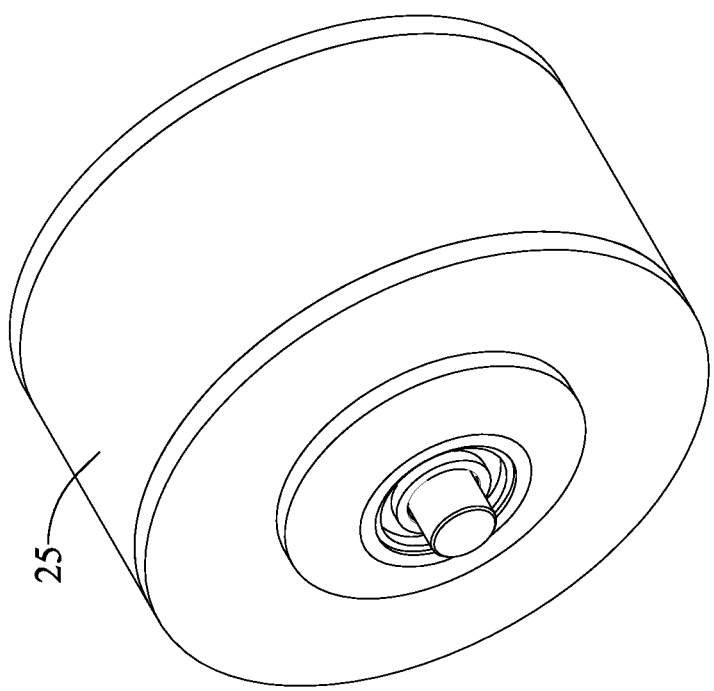
FIG. 7 is the first schematic view of the second embodiment of the compliance motor structure in accordance with the present invention.
Figure 8:
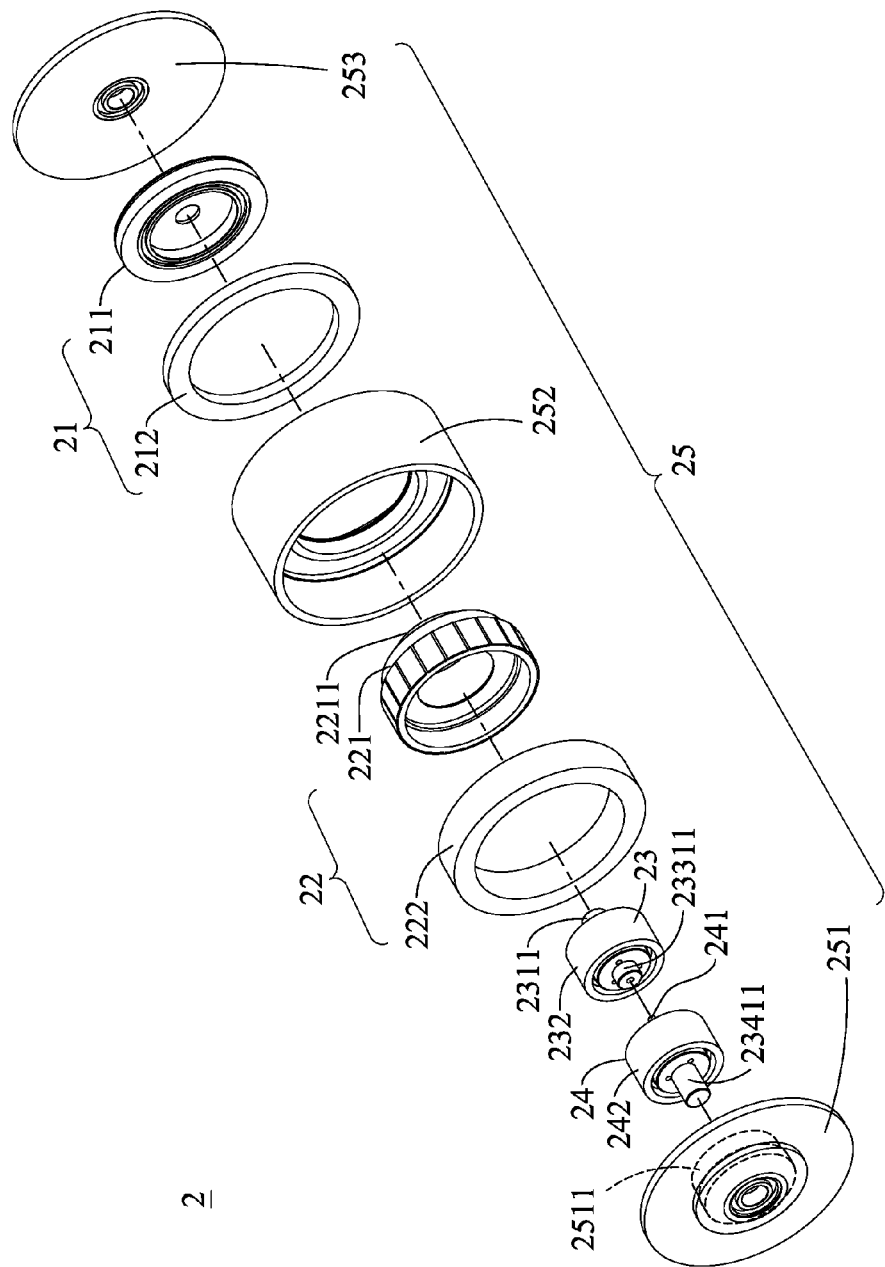
FIG. 8 is the second schematic view of the second embodiment of the compliance motor structure in accordance with the present invention.

Please refer to FIG. 7, FIG. 8, FIG. 9A and FIG. 9B, which are the first schematic view, second schematic view, third schematic view and fourth schematic view of the second embodiment of the compliance motor structure in accordance with the present invention. The embodiment illustrates a preferred embodiment of a dual-motor structure with two gear sets. As shown in FIG. 7 and FIG. 8, the compliance motor structure 2 may include a first servo motor 21, a second servo motor 22, a differential gear set 23, a reduction gear set 24 and a casing 25.

The casing 25 may include a front cover 251, an annular main body 252 and a rear cover 253; the casing 25 can accommodate the first servo motor 21, the second servo motor 22, the differential gear set 23 and the reduction gear set 24.

The first servo motor 21 may include a first stator 212 and a first rotor 211, where the first stator 212 and the first rotor 211 may be hollow; the first rotor 211 can be disposed in the accommodating space inside the hollow center of the first stator 212. The second servo motor 22 may include a second stator 222 and a second rotor 221, where the second stator 222 and the second rotor 221 may be hollow; the second rotor 221 can be disposed in the accommodating space inside the hollow center of the second stator 222.

Figure 9A:
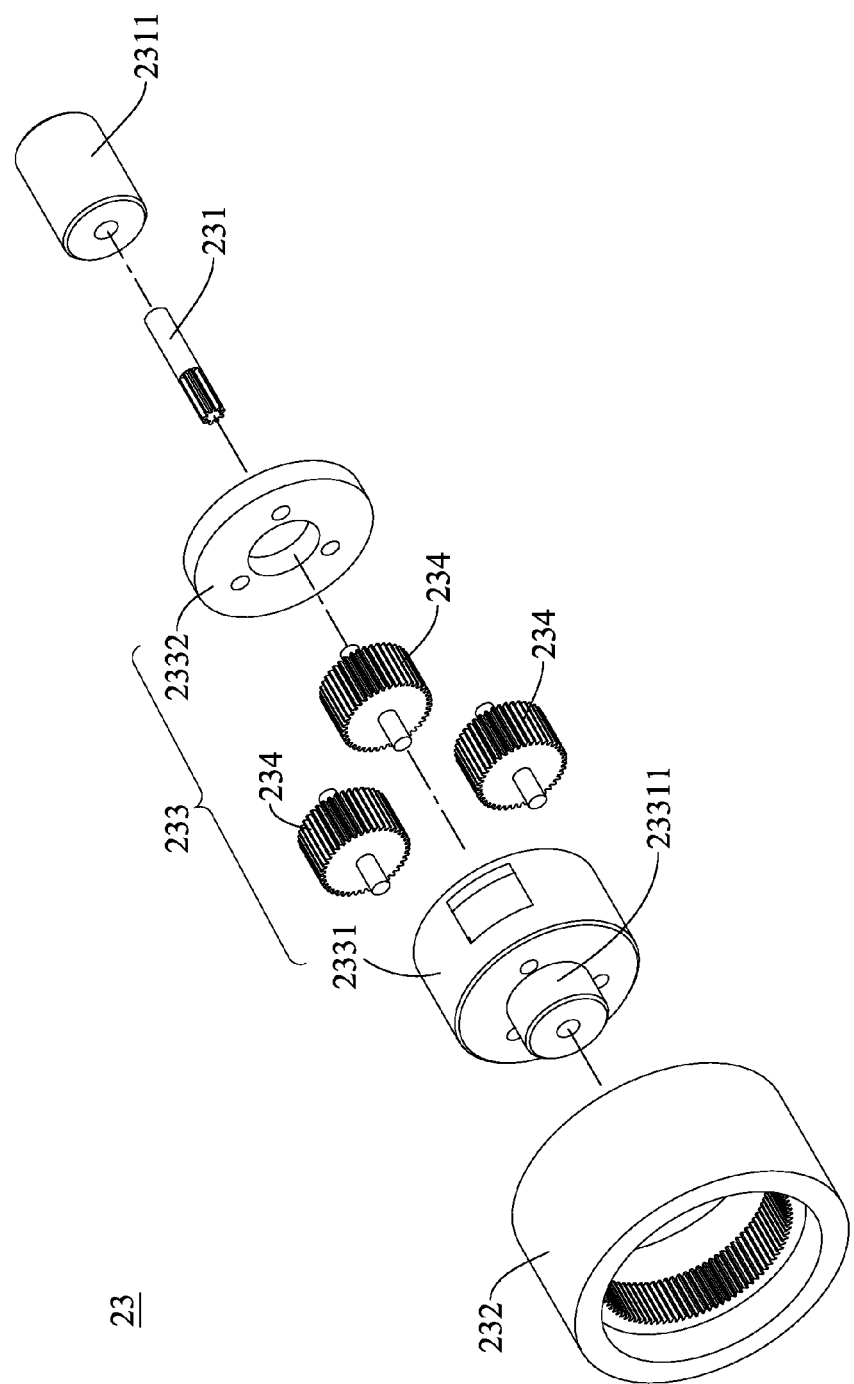
FIG. 9A is the third schematic view of the second embodiment of the compliance motor structure in accordance with the present invention.

The differential gear set 23 may be a planetary gear set, which may be disposed in the accommodating space of the hollow center of the first rotor 211; as shown in FIG. 9A, the differential gear set 23 may include a first sun gear 231, a first ring gear 232, a first planet carrier 233 and a plurality of first planet gears 234; the first sun gear 231, the first ring gear 232 and the first planet carrier 233 are coupled to each other via the first planet gears 234. As shown in FIG. 8 and FIG. 9A, the first sun gear 231 may be connected to the first rotor 111 via a cup-shaped extension component 2311; further, the second rotor 221 may include a rotor extension part 2211, and the second rotor 221 may be connected to the first ring gear 232 via the rotor extension part 2211. The first planet carrier 233 may include a first planet carrier front cover 2331 and a first planet carrier rear cover 2332; and the first planet carrier front cover 2331 may include a cup-shaped first planet carrier extension part 23311, which can be connected to the reduction gear set 24.

Figure 9B:
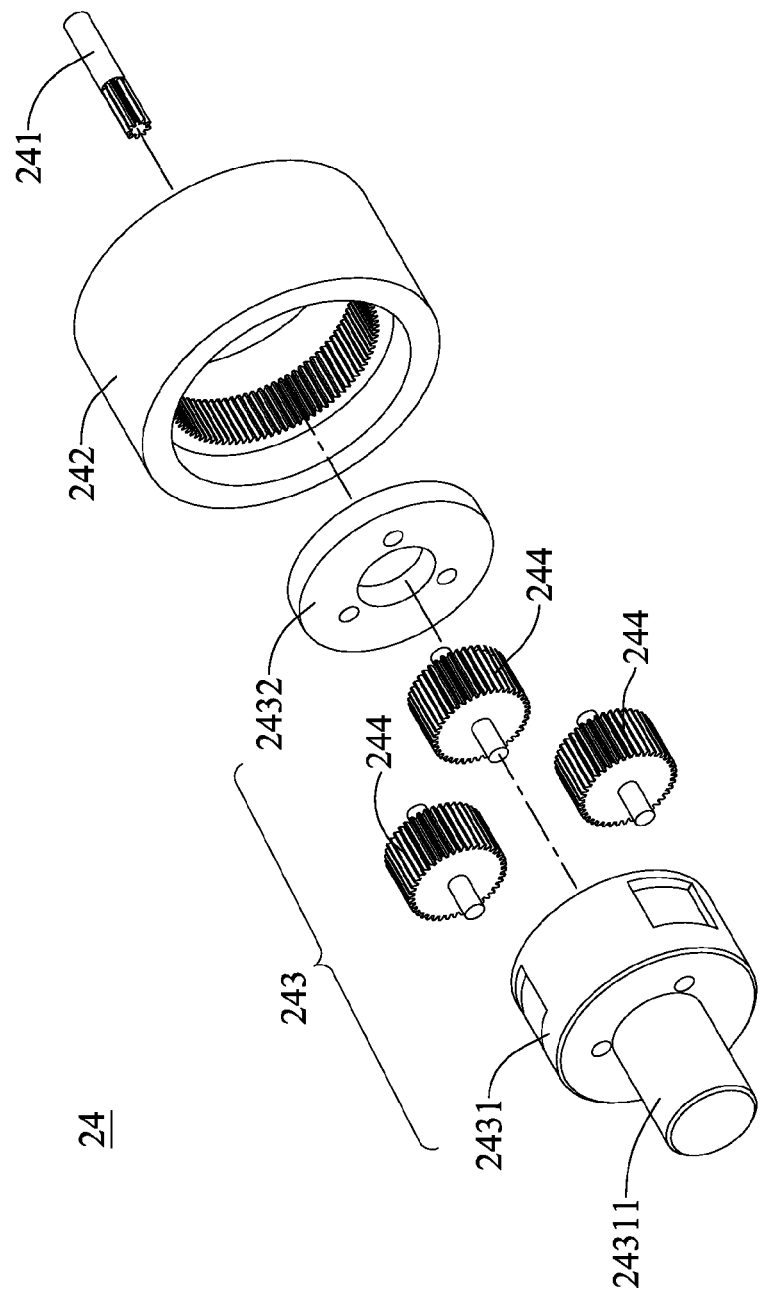
FIG. 9B is the fourth schematic view of the second embodiment of the compliance motor structure in accordance with the present invention.

Similarly, the reduction gear set 24 may be a planetary gear set, which may be disposed in the accommodating space of the hollow center of the second rotor 221; as shown in FIG. 9B, the reduction gear set 24 may include a second sun gear 241, a second ring gear 242, a second planet carrier 243 and a plurality of second planet gears 244; the second sun gear 241, the second ring gear 242 and the second planet carrier 243 are coupled to each other via the second planet gears 244. As shown in FIG. 8 and FIG. 9B, the first planet carrier extension part 23311 of the differential gear set 23 may be connected to the second sun gear 241 of the reduction gear set 24, such that the power generated by the first servo motor 21 and the second servo motor 22, coupled to the differential gear set 23 and the reduction gear set 24, can be transmitted through the first sun gear 231 and the first ring gear 232 of the differential gear set 23 and the second sun gear 241 of the reduction gear set 24, and then outputted via the second planet carrier 243. The second planet carrier 243 may include a second planet carrier front cover 2431 and a second planet carrier rear cover 2432; and the second planet carrier front cover 2431 may include a cup-shaped second planet carrier extension part 24311, which can extend to the outside of the casing 25 to serve as the output shaft of the compliance motor structure 2. The second ring gear 242 of the reduction gear set 24 may be fixed on the front cover extension part 2511 of the front cover 251 of the casing 25.

By means of the above structure, the power generated by the first servo motor 21 and the second servo motor 22 coupled to the differential gear set 23 and the reduction gear set 24 can be outputted via the second planet carrier 243. In other preferred embodiments, the differential gear set 23 and the reduction gear set 24 can be cycloidal gear sets or harmonic gear sets or other gear structures whose output shaft and input shaft are on the same axis. Besides, the aforementioned compliance motor structure 2 may further include at least one encoder and at least one Hall sensor (not shown in the drawings); both of them can be disposed inside the casing 25. Of course, the above structure design is just for example instead of limitation; the present invention is not limited to the above structure.

According to the above description, the compliance motor structure 2 of the embodiment can further include a reduction gear set 24 in addition to the differential gear set 23; therefore, the compliance motor structure 2 of the embodiment is able to satisfy more different requirements. Furthermore, the differential gear set 23 and the reduction gear set 24 can be disposed in the accommodating space inside the hollow rotors of the first servo motor 21 and the second servo motor 22, which can effectively reduce the size of the compliance motor structure 2.

Moreover, the compliance motor structure 2 of the above embodiment can be operated under at least 6 kinds of operation modes. When the compliance motor structure 2 is operated under the compliance mode, it is applicable to a variety of medical assistive tools, such as exoskeleton robot, surgical robot, rehabilitation robot and the like. Besides, the compliance motor structure 2 can be further operated under the lock mode, reduction mode, differential-speed mode, differential-position mode and speed interference mode, etc. Thus, the compliance motor structure 2 can provide various functions so as to satisfy various requirements. The examples of the operation modes of the compliance motor structure 2 are shown in Table 1:

TABLE 1

| | First servo motor | | | |
|---|---|---|---|---|
| Second servo motor | Stop | Torque control | Speed control | Position control |
| Stop | Lock mode | Reduction mode (Torque↑) | Reduction mode (Speed↓) | Reduction mode (Displacement↓) |
| Torque control (Torque↑) | Reduction mode | Compliance mode (Torque) | Compliance mode (Speed) | Compliance mode (Position) |
| Speed control (Speed↓) | Reduction mode | Compliance mode (Speed) | Differential-speed mode (Speed V1-V2) | Speed interference mode |
| Position control (Torque↓) | Reduction mode | Compliance mode (Position) | Speed interference mode | Differential-position mode (Position S1-S2) |

As described above, when one of the two motors executes the torque control, the dual-motor structure can be operated under the torque compliance mode, speed compliance mode and position compliance mode, which is very suitable for various medical assistive devices. Those skilled in the art should be familiar with the above operation modes, so the details of these operation modes will not be discussed therein.

Figure 10:
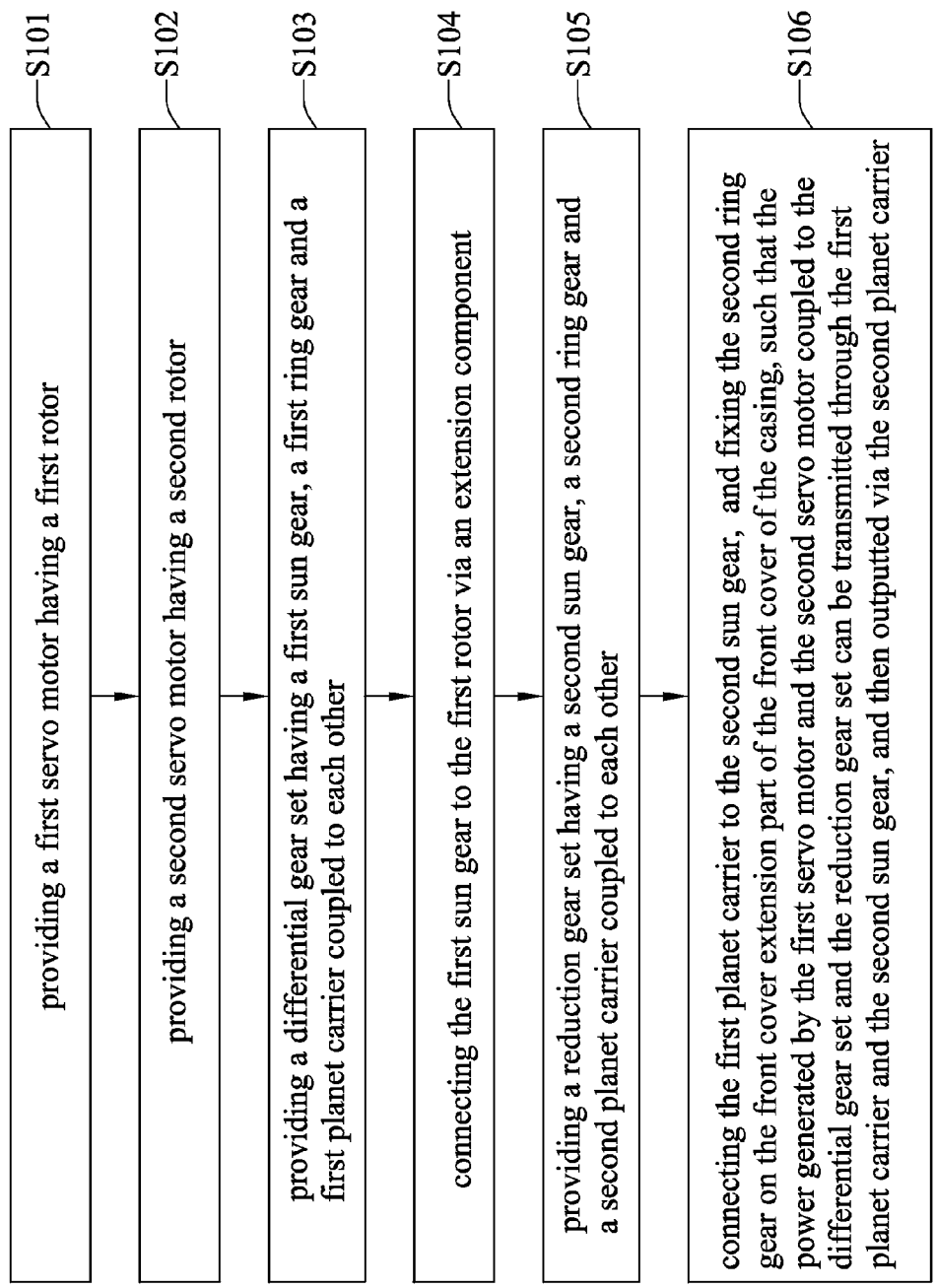
FIG. 10 is the flow chart of the second embodiment of the method for manufacturing the compliance motor structure in accordance with the present invention.

Please refer to FIG. 10, which is the flow chart of the second embodiment of the method for manufacturing the compliance motor structure in accordance with the present invention. The method for manufacturing the compliance motor structure of the embodiment may include the following steps:

In Step S101: providing a first servo motor having a first rotor.

In Step S102: providing a second servo motor having a second rotor.

In Step S103: providing a differential gear set having a first sun gear, a first ring gear and a first planet carrier coupled to each other.

In Step S104: connecting the first sun gear to the first rotor via an extension component.

In Step S105: providing a reduction gear set having a second sun gear, a second ring gear and a second planet carrier coupled to each other In Step S106: connecting the first planet carrier to the second sun gear, and fixing the second ring gear on the front cover extension part of the front cover of the casing, such that the power generated by the first servo motor and the second servo motor, coupled to the differential gear set and the reduction gear set, can be transmitted through the first planet carrier and the second sun gear, and then outputted via the second planet carrier.

Figure 11:
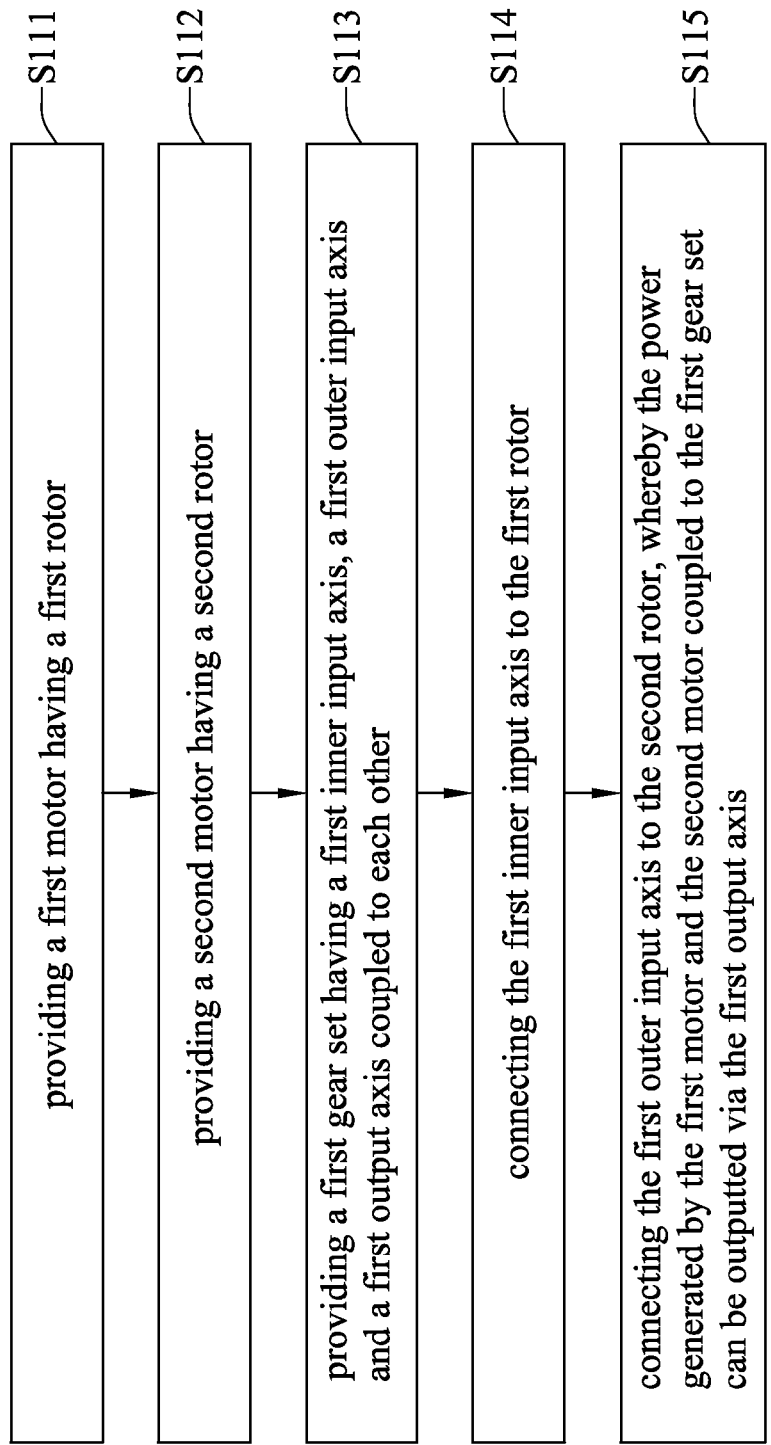
FIG. 11 is the flow chart of the method for manufacturing the compliance motor structure in accordance with the present invention.

Please refer to FIG. 11, which is the flow chart of the method for manufacturing the compliance motor structure in accordance with the present invention. The method for manufacturing the compliance motor structure in accordance with the present invention may include the following steps:

In Step S111: providing a first motor having a first rotor.
In Step S112: providing a second motor having a second rotor.
In Step S113: providing a first gear set having a first inner input shaft, a first outer input shaft and a first output shaft coupled to each other.

In Step S114: connecting the first inner input shaft to the first rotor.

In Step S115: connecting the first outer input shaft to the second rotor, whereby the power generated by the first motor and the second motor, coupled to the first gear set, can be outputted via the first output shaft.

The detailed description and the exemplary embodiments of the method for manufacturing the compliance motor structure in accordance with the present invention have been described in the description of the compliance motor structure in accordance with the present invention; therefore, they will not be repeated herein again.

To sum up, in one embodiment of the present invention, the differential gear set is disposed in the accommodating space of the hollow center of the rotor of the first motor, and the first motor and the second motor are respectively connected to the two input shaft of the differential gear set. The above compact structure design can not only significantly reduce the overall size of the dual-motor with single gear set, but also can be operated under the compliance mode, which is more convenient for use.

In one embodiment of the present invention, the rotor of the first motor can be connected to the sun gear of the differential gear set via the extension component, and the rotor of the second motor can be connected to the ring gear of the differential gear set via the extension part. In this way, the two motors can be coupled to the differential gear set without complicated interface structure, which can not only reduce the overall size of the dual-motor structure, but also can decrease the complexity of the dual-motor structure.

The compliance motor structure according to the present invention can not only be operated under the compliance mode, but also can be operated under various operation modes, such as lock mode, reduction mode, differential-speed mode, differential-position mode and speed interference mode. Thus, the compliance motor structure can provide more functions by composing of different modes, which make its application more comprehensive.

The compliance motor structure according to the present invention can effectively decrease the size of the dual-motor structure; thus, the compliance motor structure is applicable to various medical assistive devices, such as exoskeleton robot, surgical robot, rehabilitation robot and other medical assistive devices. Therefore, the compliance motor structure according to the present invention has excellent practicality and of high commercial value.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A compliance motor structure, comprising:
   a first motor, comprising a first rotor;
   a second motor, comprising a second rotor;
   a first gear set, comprising a first inner input shaft, a first outer input shaft and a first output shaft coupled to each other; the first inner input shaft being connected to the first rotor; the first outer input shaft being connected to the second rotor, whereby a power generated by the first motor and the second motor coupled to the first gear set being outputted via the first output shaft; and
   a second gear set, wherein the second gear set comprises a second inner input shaft, a second outer input shaft and a second output shaft coupled to each other; the first output shaft is connected to the second inner input shaft, whereby a power generated by the first motor and the second motor, coupled to the first gear set and the second gear set, is transmitted through the first output shaft and the second inner input shaft and then outputted via the second output shaft; the second outer output shaft is fixed.

2. The compliance motor structure of claim 1, wherein the first gear set is a differential gear set.

3. The compliance motor structure of claim 2, wherein the second gear set is a reduction gear set.

4. The compliance motor structure of claim 1, further comprising a casing, wherein the second outer input shaft is fixed on the casing.

5. The compliance motor structure of claim 1, wherein the first rotor is hollow, and the first gear set is disposed in an accommodating space inside the first rotor.

6. The compliance motor structure of claim 5, wherein the second rotor is hollow, and the second gear set is disposed in an accommodating space inside the second rotor.

7. The compliance motor structure of claim 6, wherein the first gear set is a planetary gear set; a sun gear of the first gear set is connected to the first rotor; a ring gear of the first gear set is connected to the second rotor; a planet carrier of the first gear set is connected to the second inner input shaft.

8. The compliance motor structure of claim 7, wherein the second gear set is a planetary gear set; the planet carrier of the first gear set is connected to a sun gear of the second gear set, whereby a power generated by the first motor and the second motor, coupled to the first gear set and the second gear set, is transmitted through the sun gear and the ring gear of the first gear set and a sun gear of the second gear set and then outputted via a planet carrier of the second gear set; a ring gear of the second gear set is fixed.

9. The compliance motor structure of claim 1, wherein the first gear set and the second gear set are planetary gear sets, cycloidal gear sets or harmonic gear sets.

10. The compliance motor structure of claim 1, wherein the first motor and the second motor are servo motors.

11. The compliance motor structure of claim 1, further comprising at least one encoder.

12. The compliance motor structure of claim 11, further comprising at least one Hall sensor.

13. A method for manufacturing a compliance motor, comprising the following steps:
   providing a first motor having a first rotor;
   providing a second motor having a second rotor;
   providing a first gear set having a first inner input shaft, a first outer input shaft and a first output shaft coupled to each other;
   connecting the first inner input shaft to the first rotor, and connecting the first outer input shaft to the second rotor, whereby a power generated by the first motor and the second motor, coupled to the first gear set, is outputted via the first output shaft;
   providing a second gear set having a second inner input shaft, a second outer input shaft and a second output shaft coupled to each other; and
   connecting the first output shaft to the second inner input shaft, and fixing the second outer input shaft, whereby a power generated by the first motor and the second motor coupled to the first gear set and the second gear set being transmitted through the first output shaft and the second inner input shaft and then being outputted via the second output shaft.

14. The method of claim 13, wherein the first gear set is a differential gear set.

15. The method of claim 14, wherein the second gear set is a reduction gear set.

16. The method of claim 13, further comprising the following step:
fixing the second outer input shaft on a casing of the compliance motor structure.

17. The method of claim 13, further comprising the following step:
disposing the first gear set in an accommodating space inside the first rotor.

18. The method of claim 17, further comprising the following step:
disposing the second gear set in an accommodating space inside the second rotor.

19. The method of claim 18, wherein the first gear set is a planetary gear set; a sun gear of the first gear set is connected to the first rotor; a ring gear of the first gear set is connected to the second rotor; a planet carrier of the first gear set is connected to the second inner input shaft.

20. The method of claim 19, wherein the second gear set is a planetary gear set; the planet carrier of the first gear set is connected to a sun gear of the second gear set, whereby a power generated by the first motor and the second motor, coupled to the first gear set and the second gear set, is transmitted through the sun gear and ring gear of the first gear set and a sun gear of the second gear set and then outputted via a planet carrier of the second gear set; a ring gear of the second gear set is fixed.

21. The method of claim 13, wherein the first gear set and the second gear set are planetary gear sets, cycloidal gear sets or harmonic gear sets.

22. The method of claim 13, wherein the first motor and the second motor are servo motors.

* * * * *